April 4, 1961    R. L. CANDELL    2,978,171
TOLL CHARGE RECORDING SYSTEM
Filed Dec. 30, 1958    10 Sheets-Sheet 1
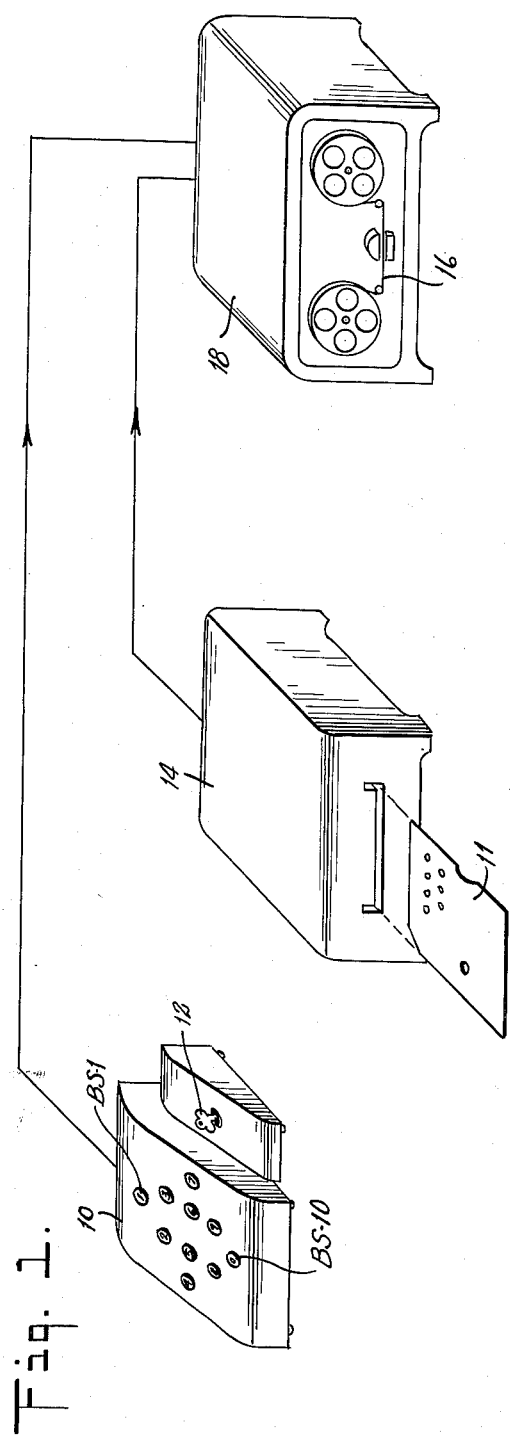
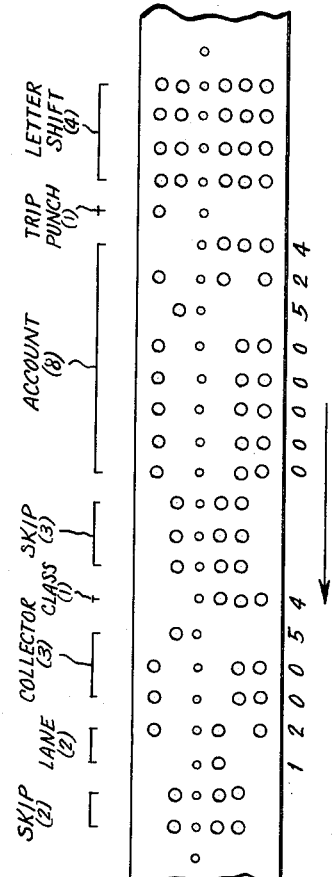
INVENTOR.
RALPH L. CANDELL
BY
ATTORNEY

| CHARACTER COMMAND | TAPE CODE |
|---|---|
| 0 | 1,4,5 |
| 1 | 3 |
| 2 | 1,3,5 |
| 3 | 1,3,4 |
| 4 | 3,4,5 |
| 5 | 2 |
| 6 | 1,2,5 |
| 7 | 1,2,4 |
| 8 | 2,4,5 |
| 9 | 1,2,3 |
| SKIP | 2,3,4 |
| TRIP PUNCH | 1 |
| LETTER SHIFT | 1,2,3,4,5 |

April 4, 1961

R. L. CANDELL 2,978,171

TOLL CHARGE RECORDING SYSTEM

Filed Dec. 30, 1958

INVENTOR.
RALPH L. CANDELL
BY
ATTORNEY

April 4, 1961  R. L. CANDELL  2,978,171
TOLL CHARGE RECORDING SYSTEM
Filed Dec. 30, 1958  10 Sheets-Sheet 10

INVENTOR.
RALPH L. CANDELL
BY
ATTORNEY

United States Patent Office 2,978,171
Patented Apr. 4, 1961

2,978,171

TOLL CHARGE RECORDING SYSTEM

Ralph L. Candell, Brooklyn, N.Y., assignor, by mesne assignments, to Shoup Electronics Inc., Jamaica, N.Y., a corporation of New York Filed Dec. 30, 1958, Ser. No. 783,767

16 Claims. (Cl. 234—16)

This invention relates to toll road equipment. More particularly, the invention relates to a charge transaction recording system for toll roads.

Toll roads are so extensively used by common carriers that charge accounts have become a feature of their operation. To maintain toll road charge accounts, it is necessary to generate a record of charge transactions at the several toll collecting plazas of a toll road system, which record may be employed for the purpose of billing at a central accounting point.

It is, therefore, the principal object of the invention to provide a system whereby data pertinent to the maintenance of a charge account is collected at the toll plaza, and embodied in durable form suitable for use in data processing equipment at a central accounting point.

Specifically, it is the purpose of the invention to provide a system capable of generating distinctive toll charge data at each of a plurality of traffic lanes, comprising a toll collecting plaza and of recording such data on a record tape.

A system of the kind above characterized presents a number of difficulties which are satisfactorily solved by this invention. In the first place, several traffic lanes of a given toll plaza may simultaneously call for use of the single tape recorder which is utilized in this system and which serves that particular plaza. In the second place, the various items of data ordinarily originate at different locations of the system and are, therefore, manifested at different points therein. Finally, separate items of data may be manifested in either decimal or coded form.

It is, therefore, a further object of the invention to provide a system in which charge datum generated at the several traffic lanes of a toll plaza are routed to a single tape recorder, and one in which a sequence control selects one traffic lane of a plurality of such lanes simultaneously calling for use of the tape recorder for read out of data to the recorder while holding in abeyance the other lanes of such plurality for subsequent, sequential read out.

It is a further object of the invention to provide a system having means for collecting charge datum from a plurality of different sources within a single traffic lane, and for transmitting items of such datum to the tape recorder in a fixed sequence.

It is a still further object of the invention to provide a system capable of handling separate data items some of which are manifested in decimal form while others are manifested in the form of a multi-bit code. Withal, it is an ultimate purpose of the system to translate data items into a common code compatible with the operation of the tape recorder and transmit such items in an ordered sequence to the tape recorder in a common form which is acceptable to the tape recording equipment.

These and other objects, advantages and novel features of the invention will be pointed out herein below, and others will become apparent from a perusal of the following specification, which is illuminated by the drawings forming a part hereof.

In the drawings, like reference numerals represent like parts, and:

Fig. 1 is a diagrammatic illustration of the principal components of the system comprising the invention;

Fig. 2 illustrates a charge plate or card adapted to be read in the charge plate reader of Fig. 1;

Fig. 2A is a section of tape showing items pertinent to the charge transaction, together with certain functional commands punched therein;

Fig. 5 is a fragmentary diagrammatic view in perspective, designed to illustrate the principal functions of a suitable tape punch;

Figures 3, 4:
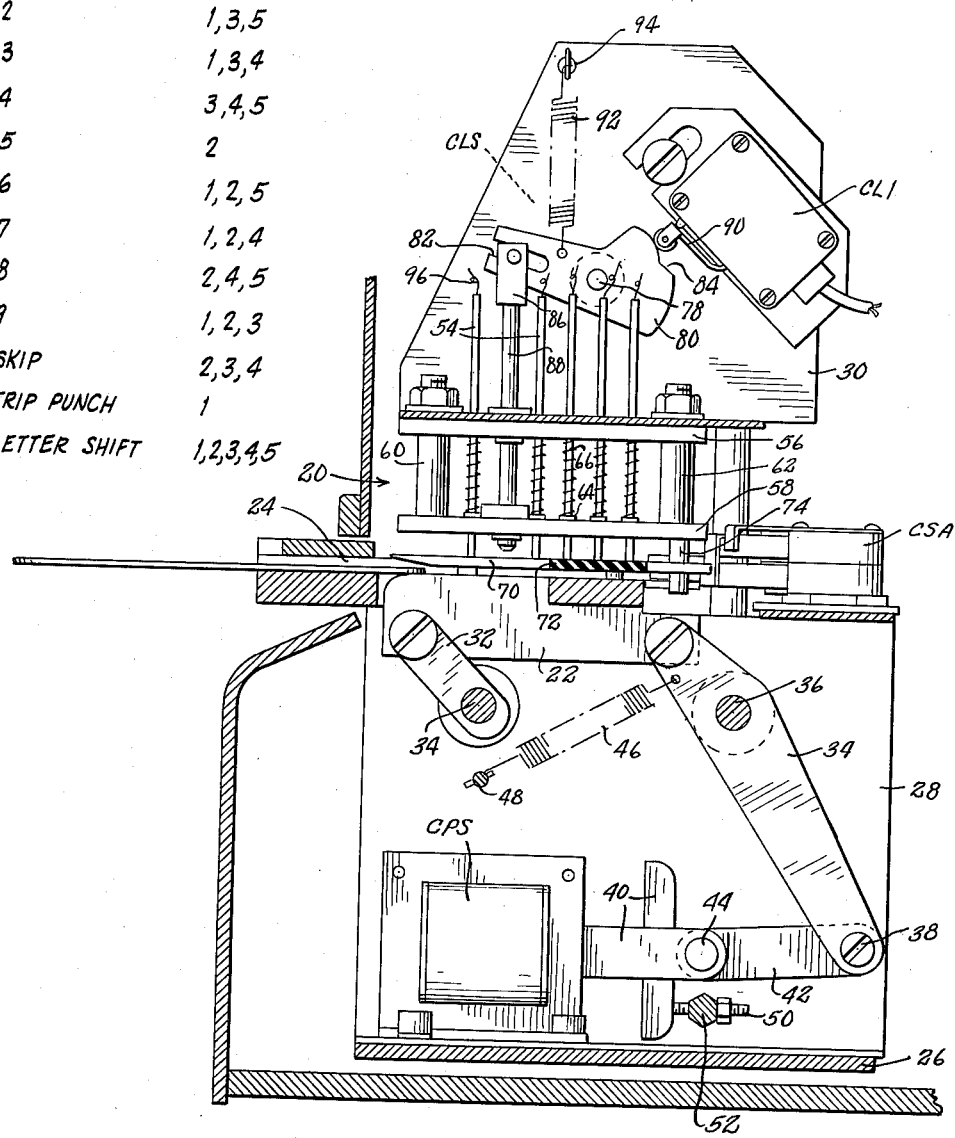
Fig. 3 is a table showing a tape code suitable to the system.
Fig. 4 is an elevational view, partly in section, of a charge plate reader.

As suggested above, the system comprising the invention herein is designed to collate various items of information originating at different sources and manifested in part by a multi-bit code and in part by decimal representations; program such items through the system, translate the decimal representations in to a multi-bit code, and punch all of the information, in common coded form, into a tape.

Fig. 1 represents a plurality of data sources and a tape punch wherein the data collected from the several sources is punched into a tape. Specifically, one data source is a classification button box and collector identifier unit 10. This unit includes a plurality of button switches BS-1 through BS-10 by which the classification of a vehicle may be represented, for example, by counting the axles thereof. This particular intelligence is represented as a decimal quantity. A unique collector's key 12, which identifies the particular toll collector on duty, sets up a collector identifying number of three digits, this information also being represented in a coded form which differs from that used in the tape. A punched charge card reader 14 is adapted to read a charge card 11 which is issued to authorize charge account users of the road. The charge card 11 is presented by the driver of the vehicle and is inserted into the card reader 14 by the toll collector. The charge card 11 has a charge account number punched therein in the form of tape code representations. The data derived from a setting of the BS-1 through BS-10 classification buttons, the collector identifier key 12 and the reading of a card 11 in the punch card reader 14, together with certain other fixed data, as shall be explained hereinafter, are sequentially programmed through the system, translated where necessary into the tape code, and then punched into a tape 16 by operation of a tape punch 18.

It should be pointed out at this point that a toll road plaza usually consists of a number of traffic lanes at each one of which is stationed a toll collector. Consequently, the system herein is designed to provide a classification button box and collector identifier 10 as well as a card reader 14 at each traffic lane of a particular toll plaza, but only a single tape punch at the plaza for receiving the data from all of its lanes. The system herein is, therefore, designed to sequentially recognize the several lanes of the plaza for the purpose of routing the lane originated data into the tape punch such that the equipment at only one lane can have access to the tape punch 18 at any particular time. Accordingly, if two or more lanes call for use of the tape punch at the same time, only one lane will be recognized and permitted to transmit its data to the tape punch, while any other lanes calling for use of the tape punch are held in abeyance until the tape punch is free, whereupon a second lane will be given access to the punch.

By reference to Fig. 3, it can be seen that the tape code which is employed in a —5— bit code and that the nine numeric digits, a Skip command and a Trip Punch command are represented by odd bit combinations therby providing for an odd parity check in the equipment in which the tape is to be employed. It is a fundamental purpose of this invention to provide a tape containing all of the necessary charge data such that the tape data can be converted into suitable input form for use in a data processing system capable of processing the tape information, as may be required, for the rendering of periodic bills. The Skip signal shown in Fig. 3 as well as the Trip Punch signal shown therein, are command signals generated for the benefit of the tape processing equpment. The Letter Shift signal is utilized as an end of record indication and to provide a convenient tear zone in the tape.

The exemplary tape section illustrated in Fig. 2A, illustrates a punched tape record which the system herein is designed to generate. It will be seen by reference to Fig. 2A, that the tape has five bit levels 1, 2, 3, 4 and 5 and a row of feed holes F. Each transverse row of holes in the tape represents a numeric charge data character or a functional command. As shown in the tape of Fig. 2A, it is contemplated that two successive Skip commands be punched as the first characters of a record. These commands are followed by a traffic lane identification number not exceeding two digits. Next, the toll collector's number, not exceeding three digits, is punched into the tape, whereafter the vehicle class is represented by a single digit. Then follow three additional Skip commands after which the account number, up to eight digits, read from the charge card is punched. Finally, the tape record includes a single digit Trip Punch command after which the end of the record is indicated by four Letter Shift representations.

As constituted, the tape of Fig. 2A indicates that collector number 5, serving at lane 12, recorded the passage of a four axle vehicle belonging to account number 524.

It will be pointed out during the discussion of the system circuit that each traffic lane has a charge scan switch CSS (Fig. 12) which has six decks and twenty-five contact points in each deck. The charge scan switch is adapted to store and collate the information represented in the tape of Fig. 2A from various sources in the lane to which it is related and transmit such data to the tape punch when selected to do so.

Figure 12:
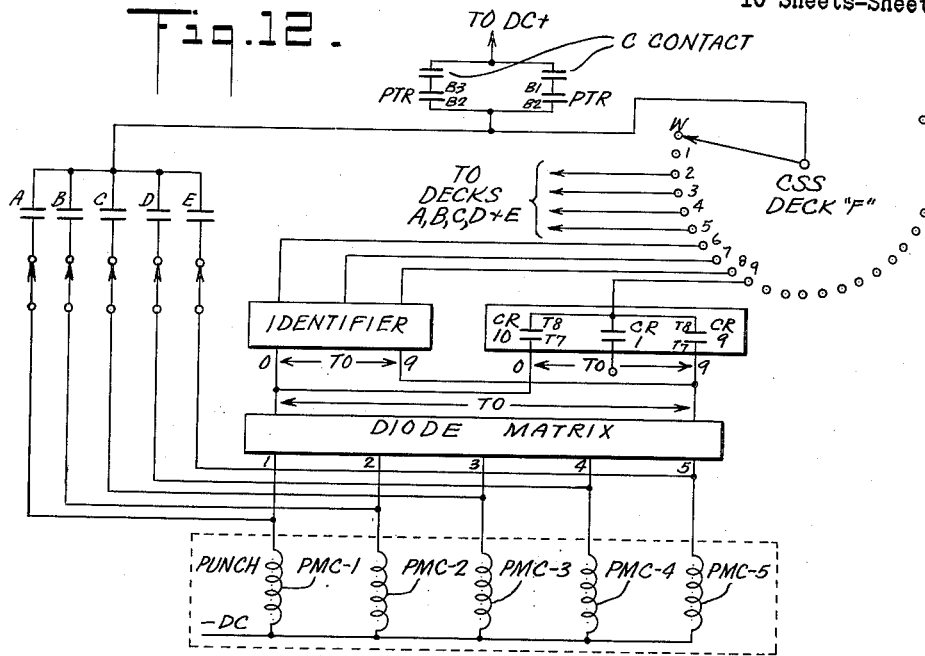
Fig. 12 is a wiring diagram of read out and translating circuits antecedent to the tap punch.

Accordingly, each successive positon of the charge scan switch CSS corresponds to a character punched into the tape. The first five decks of the charge scan switch are used to transmit data in tape code form, while the 6th deck is employed to handle the information which requires encoding from decimal form to the multi-bit form employed in the tape. A specific use of the charge scan switch is indicated in Fig. 12. As shown in Fig. 12, the first point of the charge scan switch CSS is not utilized to transmit data, but it does provide time in the scanning cycle for the punch to be conditioned. Points 2 and 3 of the switch read out a permanently wired contact in the second, third and fourth decks thereof to produce the Skip commands in the tape. Points 4 and 5 of the switch read out the traffic lane number by which the lane identification number is punched into the tape. Points 6, 7 and 8 of the switch read out the toll collector's identifying number as set up by his key 12; this number being different for each collector. Point 9 of the switch reads out the single vehicle classification digit set up on the classification button box. The 10th, 11th and 12th point of the switch then produces three successive Skip commands while points 13 through 20 will read out the charge account number set up in the card reader 14 by the charge card 11. The charge account number, as indicated, is in the tape code notation. The 21st point produces the Trip Punch command while points 22 through 25 read out energized complete sets of points in the five decks of the switch to produce the four rows of Letter Shift perforators at the end of the charge record.

The charge card 11 of Fig. 2 is characterized by a plurality of physical features which cooperate with elements of the card reader and which are adapted to influence the response of the system circuit. The card 11 has a pair of parallel edges 13 and 15 which define the width of the card and which control the lateral position of the card within the reader by cooperating with a card reading throat at the entrance of the reader. The forward edge 17 of the card is adapted to contact a pair of stop pins in the reader to control the longitudinal position of the card. A diagonally cut corner 19 facilitates insertion of the card into the card reader throat. Data such as an account number is represented in the card by a plurality of punched holes 21, and a locking hole 23 is provided for cooperation with a card locking pin which holds the card in reading position within the reader until a reading operation is performed.

The charge card is read in a card reader which embodies the structure disclosed in the application for United States Patent, Serial No. 783,821, filed concurrently by Albert Cohen, under the title Card Reader. So much of that card reader, as may be necessary for a full understanding of the present invention is disclosed in Fig. 4.

In Fig. 4, which is a cross-sectional view through the card reader, is disclosed a reading pin assembly 20 and a reading plate 22 between which the card is inserted by way of a card throat 24. The card plate 22 and its operating mechanism is mounted in the base structure of the reader, which structure consists of a base plate 26 and a pair of parallel side walls such as the side wall 28. The reading pin assembly and its related operating mechanism is supported in the superstructure of the reader which includes a head plate 30. The side walls in the base of the reader have outturned flanges at the upper edge thereof upon which the reading pin assembly 20 and the head plate 30 are mounted.

The forward end of the reading plate 22 is pivoted on the end of a pair of links, such as the link 32, the opposite ends of the links being fulcrumed on a transverse pivot 34 which is fixed in and extends between the side walls of the frame member. The rear end of the reading plate 22 is pivoted on the short arm of a pair of bell cranks, such as the bell crank 34. The bell cranks are mounted on a rear pivot shaft 36 extending between the side walls and being fixed therein. The length and angular disposition of the links and that of the short end of the bell cranks is the same, thereby forming a quadric chain arrangement, such that when the bell cranks are rocked about the rear pivot shaft 36, the reading plate 22 will be both elevated and moved rearwardly in a path of curvilinear translation. The long arm of each bell crank extends downwardly and rearwardly from the rear pivot shaft 36 where they are connected by means of a transverse connecting rod 38.

Mounted on the base plate 26 is a charge plate solenoid CPS which has an armature 40. The outer end of the armature is pivoted to a link 42 by means of a pin 44, and the opposite end of the link 42 is pivoted on the connecting rod 38. It can be seen, therefore, that whenever the card plate solenoid CPS is energized, it will attract its armature 40 such that the link 42 will be drawn to the left, as viewed in Fig. 4. This will result in the clockwise movement of the bell cranks about the rear pivot shaft 36 with the resultant operation of the reading plate 22 into card reading position. The reading plate 22 is returned to its normal inoperative position by means of a pair of springs such as the spring 46, which are connected respectively to the short ends of the bell cranks, the opposite ends of the springs being anchored in anchor studs, such as the anchor stud 48 extending inwardly from the adjacent side walls of the frame. Outward movement of the armature 40 can be adjustably regulated by means of a stop screw 50 mounted in a transverse stop shaft 52 as to make contact with the armature 40 at the desired position.

A plurality of reading pins 54 are mounted in the reading pin assembly 20. The reading pin assembly 20 consists of an upper pin guide plate 56 and a lower pin guide plate 58, the plates 56 and 58 being held in spaced relation by a pair of spacing bolts, such as the bolt 60, at the front of the assembly and a similar pair of spacing bolts, such as the bolt 62, at the rear of the assembly. Both pin guide plates 56 and 58 are formed of a rigid dielectric material. The pin guide plates have aligned holes formed therein to accommodate the reading pins 54 and to guide such pins for axial movement during a card reading operation.

Each of the reading pins 54 is grooved near its lower end to receive a snap washer 64 which constitutes the support for the lower end of a spring 66 which is coiled about the pin. The upper ends of the reading pin springs 66 abut the lower face of the upper pin guide plate 56. This results in a constant gentle spring bias of the reading pins such that the pins will enter corresponding holes in the charge card but will yield in an upward direction if no hole in the card is present.

The lower ends of the reading pins 54 extend into slots 70 of a card plate 72. The card plate 72 is formed of a sheet of rigid dielectric material and is fixed to move in spaced relation in respect to the reading plate 22. A pair of stop pins, such as the stop pin 74, are mounted in the lower pin guide plate 58 and extend downwardly through a pair of spaced slots in the card plate 72. The stop pins are so positioned that they limit the insertion of a card into the card reader.

Mounted on the head plate 30 is a rotary charge lock solenoid CLS whose rotary shaft 78 extends through a passage in the head plate 30. The inner end of the solenoid shaft 78 has fixed thereto a card locking pin actuator and cam 80. The card locking pin and actuator 80 is a generally elongated structure having a slot 82 in one end thereof and a cam surface 84 at the other end thereof. Cooperating with the slot 82 is a connecting clevis structure 86 formed at the top of a card locking pin 88. The card locking pin extends downwardly through the upper pin guide plate 56, the lower pin guide plate 58, and registers with an offset slot in the card plate 72.

The perforation 23 of the card 11 is so located in the card that it will be under the card locking pin 88. When a card is inserted into the card reader and the card lock solenoid CLS is energized to rotate the shaft 78 of the solenoid in a counterclockwise direction, the card locking pin actuator and cam 80 will project the card locking pin 88 into the hole 23 of the card, thus holding the card in position until the reading operation thereon is performed.

The cam surface 84 of the card locking pin actuator and cam 80 is in contact with an operating blade 90 of a normally opened microswitch CL1 which is mounted on the head plate 30. It is evident, therefore, that as the card lock solenoid CLS is energized and the card locking pin 88 is projected, a high part of the cam 84 will operate the blade 90 of the microswitch CL1 and thereby close the switch. When the rotary charge lock solenoid CLS is deenergized, the card locking pin actuator and cam 80 and the card locking pin 88 are elevated by means of a spring 92 whose one end is attached to the card locking pin actuator and cam 80 and whose other end is attached to a spring anchor 94 mounted in the head plate 30.

The forward edge 17 of the card and its edge 13, including a notch 25 therein, are adapted to control function within the system circuit. Mounted along the lateral edge of the card throat 24 are a pair of normally closed microswitches CSB and LO (see Fig. 10). These switches have a common operating blade which projects into the path of the card edge 13. Therefore, when a card 11 is inserted through the card reading throat 24, the edge 13 of the card will temporarily open the switches CSB and LO. However, when the card is fully inserted to bring the notch 25 into alignment with the operating blade of the switches, the blade will move inwardly far enough to reclose both switches. When the card 11 is properly positioned under the card reading pins 54 with its forward edge 17 in contact with the stop pins 74, its leading edge 17 will contact the operating blade of a normally open microswitch CSA and close the contacts thereof.

It can be seen from the foregoing, therefore, that when a charge card 11 is inserted into the card reader throat 24, such that it is properly positioned within the gap formed between the reading plate 22 and the lower ends of the reading pins 54, that it will operate the microswitch points CSA and restore the points of the microswitches CSB and LO. As to be pointed out more specifically in respect to the system circuits, the operation of the switches CSA and CSB will lead to energization of the charge lock solenoid CLS to project the card locking pin 88 and thereby lock the card in reading position. Energization of the card locking solenoid CLS operates its CL1 points and the card plate solenoid CPS will then be energized to elevate the card plate 22 and the card thereon. The card plate 22 constitutes a common source of potential for the card reading pins 54 such that when it is elevated and pins 54 sense data holes 21 in the card and come into contact with the plate, a circuit will be established such that data represented by a potential on the output leads 96 of the reading pins can be sensed and interpreted, as to be pointed out in connection with the system circuit.

The tape of Fig. 2A is produced in any suitable tape punch, as, for example, the punch disclosed in A. W. Mills et al. Patent 2,336,267, granted April 11, 1944. Only so much of the punch need be illustrated and described herein as will render its connection with the present invention intelligible. The punch is designed to perforate a paper tape with five sets of code holes transversely of the tape and also a succession of tape feed holes located near the center line of the tape.

Fig. 5 is a fragmentary perspective representation of the punch mechanism which is sufficient to explain its fundamental features. The electrical signals, representing either data or functional commands, from the system circuit are connected into appropriate punch magnet coils PMC-1 through PMC-5 (see Fig. 12). Two of such coils PMC-2 and PMC-4 are shown in Fig. 5.

When a punch magnet coil, such as PMC-2 of Fig. 5, is energized, its selector magnet armature 100 is attracted, thereby releasing a latch lever 102. The latch lever 102 engages one end of a punch actuating lever 104. When a punch clutch solenoid PCS is energized, it attracts its armature 106 which releases a clutch lever 108 and withdraws a clutch dog 110 out of the path of a ratchet tooth 112 of a continuous running shaft 114 which is driven by a punch motor PM. The ratchet shaft rotates a clutch shaft 116 and through a pair of spiral gears rotates an eccentric punch shaft 118. The eccentric portion of the shaft 118 is engaged by the punch actuating levers 104.

As the eccentric shaft 118 starts to turn, a latch lock arm 120 drops into a recess in a cam 122. When the latch lock arm 120 drops into the recess of the cam 122, it moves a latch lock bail 124 to such position that the bail locks the selected latch levers into engagement with the punch actuating levers, and the unselected latch levers out of engagement with the punch actuating levers. The actuating levers not selected are held back by a spring at the punch pin end, causing the opposite free end to swing out. The selected actuated levers are held mechanically by the latch lock levers 102 causing the punch pin end of the actuating levers 104 to swing out, moving their respective punch pins 126 toward a punch die block and a tape overlying such die block.

The punch actuating levers 104 and their respective punch pins that have been selected continue to move out through the first half of the cycle, until the punch pins have been driven through the die block and the tape. In the next half cycle, the punch pins start to return to their normal position; also, the latch lock arm 120 unlocks the selected latches 102. By action of a cam 128, a latch reset cam arm 130 moves a latch reset bail 132, which in turn starts to move the latch levers 102 out of engagement with the actuating levers 104. As the latches are restored, an armature knock-off cam arm 134 starts to operate a pair of armature knock-off bails 136 and 138. After a certain degree of movement of the latch reset bail 132, the latch levers are moved approximately 1/32 of an inch beyond the notch of the armature. The armature knock-off bails 136 and 138 then move out and drive the armature away from the cores of the punch magnet coils and against the tip of the latches, so that they are in locked position. While these armatures are moving away from the cores, the latches are stationary due to a dwell period of their reset cam.

The punch pins 126 are now out of perforated holes of the tape and at this time a feed cam 140 starts to move a feed arm 142 which engages a feed pawl 144 by means of a stud mounted on the feed arm. The feed pawl engages a tooth in a feed ratchet 146 and starts to move a feed shaft 148 and the tape controlled thereby one position. The latch reset bail 132 again moves, allowing the latch levers to engage in the notches of their associated armatures. When the latches are engaged, the armature knock-off bails 136 and 138 start to return to their normal position. The reset bail 132 continues to move away from the latches and the feed pawl 144 continues feeding the tape. The knock-off bails come to rest, then the reset bail returns to its normal position and the feed pawl has moved the feed ratchet and tape one position. A detent roller 150 settles into the teeth of a detent ratchet thereby holding the feed ratchet in position. The feed arm 142 returns, carrying the feed pawl 144 back to its normal position. The punch clutch solenoid armature 106 engages the clutch lever 108 permitting the clutch dog 110 to re-engage the drive ratchet tooth 112, thus latching the clutch and completing one cycle of the punch. It may be noted at this point that there is no latch lever such as the lever 102 related to the punch actuating lever which operates the punch which punches the tape feed hole, and this punch is not under control of a punch magnet coil. On the other hand, the feed hole punch pin and the feed hole punch actuating lever are driven out each time the eccentric shaft 118 rotates in order to punch feed holes along the entire length of the tape.

Figure 10:
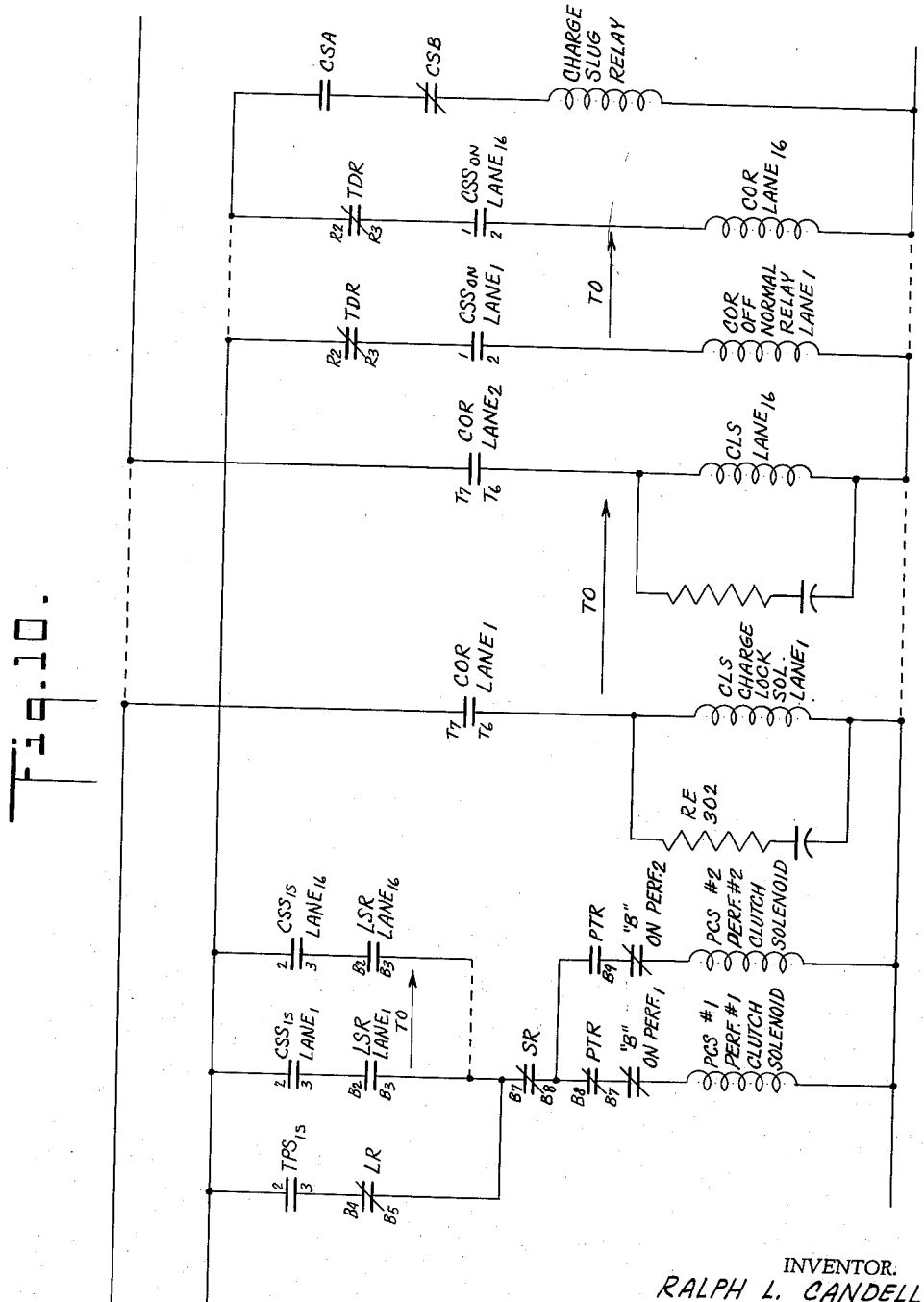
Fig. 10 is a wiring diagram of further relay circuits including such circuits associated with the tape reader.

When a vehicle arrives at a toll lane and the driver presents a charge card to the collector, the collector will insert the charge card into the charge card reader. After the card is fully inserted into the reader, this will immediately result in closure of the contacts CSA, the restoration to the closed condition of CSB contacts (Fig. 10), as well as the reclosure of the lockout contacts LO (Fig. 6) within the reader. Closure of the CSA contacts and reclosure of the CSB contacts will result in the energization of a charge slug relay CSR (Fig. 10).

Figure 8:
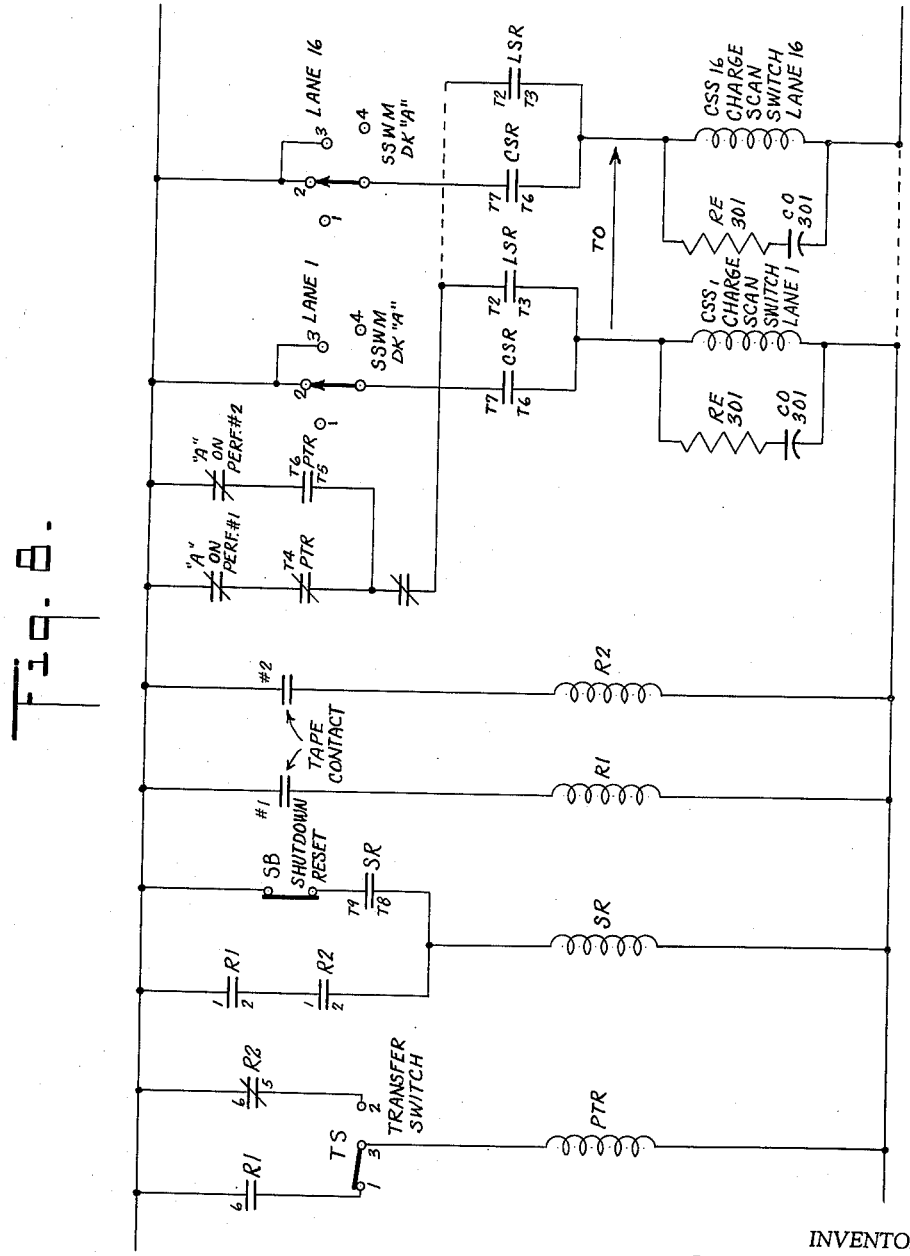
Fig. 8 is a wiring diagram of a charge scan switch and certain control relays associated with the tape punch.

In Fig. 8, the normally open T7—T6 points of the charge slug relay CSR are also closed in the circuit of a charge scan switch CSS (Fig. 8). It will be noted that the energizing circuit of the charge scan switch CSS also includes points 2 and 3 of a money stepping switch SSWM (Fig. 8). Since the money stepping switch SSWM is standing on its point 1, the circuit to the charge scan switch CSS is not yet closed and will not close until the wiper of the money stepping switch SSWM moves to point 2 of the switch.

Figure 6:
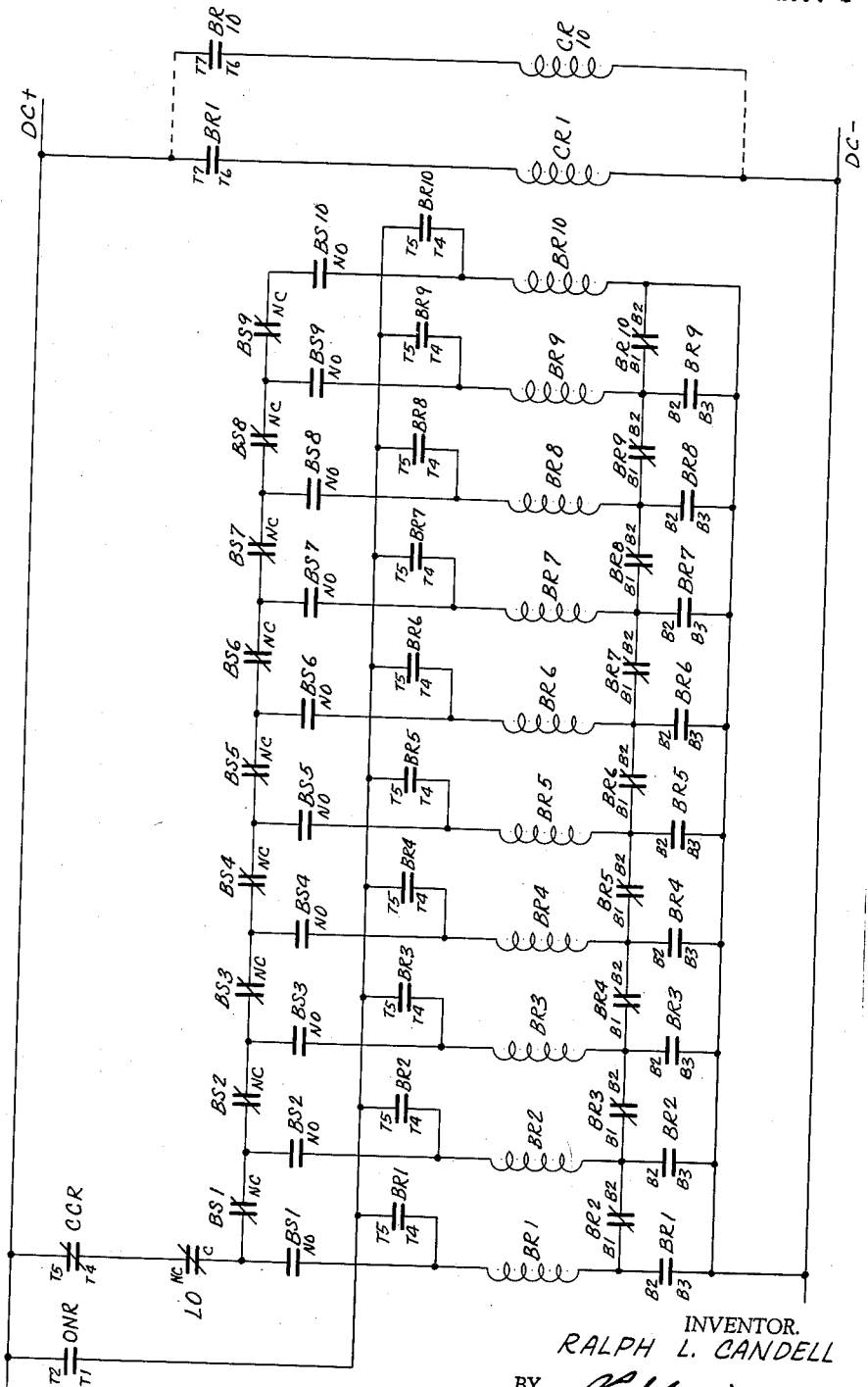
Fig. 6 is a wiring diagram pertaining to certain button and class selection relays.

After having inserted the charge plate into the reader, the collector now classifies the vehicle and indicates the classification of the vehicle by closure of an appropirate button switch in the classification button box and collector identifier 10 of Fig. 1. These button switches and their related circuits are shown in Fig. 6. By reference to Fig. 6, it will be seen that there are ten vehicle classification buttons BS1 through BS10.

The classification button circuit is energized through the normally closed T4—T5 points of a charge scan relay and the closed lock out points LO. It was pointed out that when the charge card is properly positioned within the card reader that it permits the microswitch CSB to assume its normally closed position and that the lock out points LO are operated under the same conditions. Therefore, as the card is being inserted into the reader, its edge 13 will also temporarily open the LO points but will permit them to close to their normally closed position when the notch 25 of the card registers with the operating finger of the switches.

Each classification button, when operated, picks up a related button relay of the group BR1 through BR10. The classification buttons have a normally closed contact NC in the power supply line which is common to all of the button relays BR1–BR10, and a normally open contact NO which is in the power line individual to the button relay of the respective buttons. Therefore, when a class button, such as the button BS1, is closed, it will break the common circuit to all higher order button relays by opening its normally closed points NC and will close the circuit to its own relay by closing the normally open points NO. When any one of the button relays (excepting BR1) is energized, it will open its normally closed B1—B2 points, thereby breaking the circuit to the lower order relays. The energization of any of the button relays will result in the closure of its B2—B3 points and thereby complete the circuit of that relay to the return line. Each of the button relays has a T4—T5 point through which it is held when energized.

Figure 7:
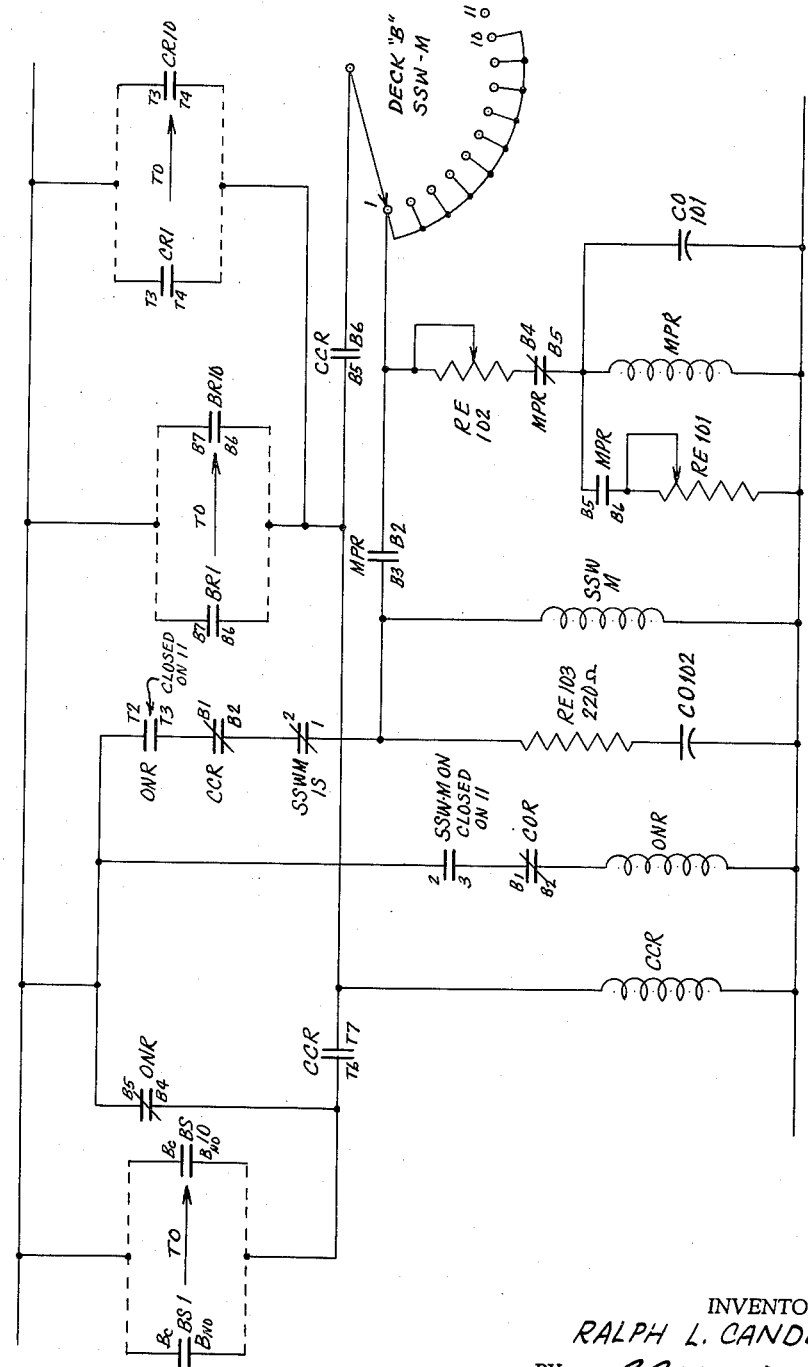
Fig. 7 is a wiring diagram of certain other control relays and a system cycle timer.

Whenever one of the button relays BR1 is energized, it closes its T6—T7 points (Fig. 6) and thus energizes a corresponding class relay of the group CR1 through CR10. By reason of energization of the button relay and the class relay, their respective B6—B7 and T3—T4 points (Fig. 7) are closed with the result that a circuit is established through the B6—B7 points of the energized button relay and is maintained through the T3—T4 points of the class relay to energize a cycle control relay CCR (Fig. 7). The cycle control relay CCR, now energized, will close its B5—B6 points (Fig. 7) such that a circuit is established by way of the wiper of the money stepping switch SSWM and its point 1 to a money pulsing relay MPR (Fig. 7), which is used to generate a chain of pulses to step the money stepping switch SSWM through a cycle. This circuit is by way of a resistance RE102 and a capacitance CO101 which delay the pick-up of the money pulsing relay MPR for about 100 milliseconds. The points B4—B5 (Fig. 7) of the money pulsing relay MPR open and the points B5—B6 thereof (Fig. 7) close to discharge the capacitor CO101 through a resistance RE101 which delays the drop out of the money pulsing relay MPR for about 100 milliseconds.

While the money pulsing relay MPR is energized, its contacts B2—B3 (Fig. 7) will energize the money stepping switch coil SSWM (Fig. 7) to drive the wiper of the money stepping switch SSWM. It can be seen, therefore, that the money stepping switch SSWM is operated each time anyone of the button relays of the group BR1 through BR10 is energized.

The coil of the money stepping switch SSWM is deenergized when the money pulsing relay MPR is deenergized since the points B2—B3 (Fig. 7) of the money pulsing relay will open and thus break the circuit to the money stepping switch SSWM. The foregoing operation is repeated to step the money stepping switch SSWM ten times. This establishes a system cycle of 10×200 milliseconds, or two seconds.

When the wiper of the money stepping switch SSWM (Fig. 8) reaches point 2, it will transmit current to the charge scan switch CSS since the T6—T7 points of the charge slug relay are now closed. The charge scan switch in moving from its first to its second position, will close its 1—2 contacts (Fig. 10) and thereby energize a charge off normal relay COR (Fig. 10) by way of the now closed 1—2 points of the charge scan switch and the normally closed R2—R3 points of a time delay relay TDR. The contacts 1—2 of the charge scan switch CSS remain closed until the charge scan switch returns to its home position.

Figure 9:
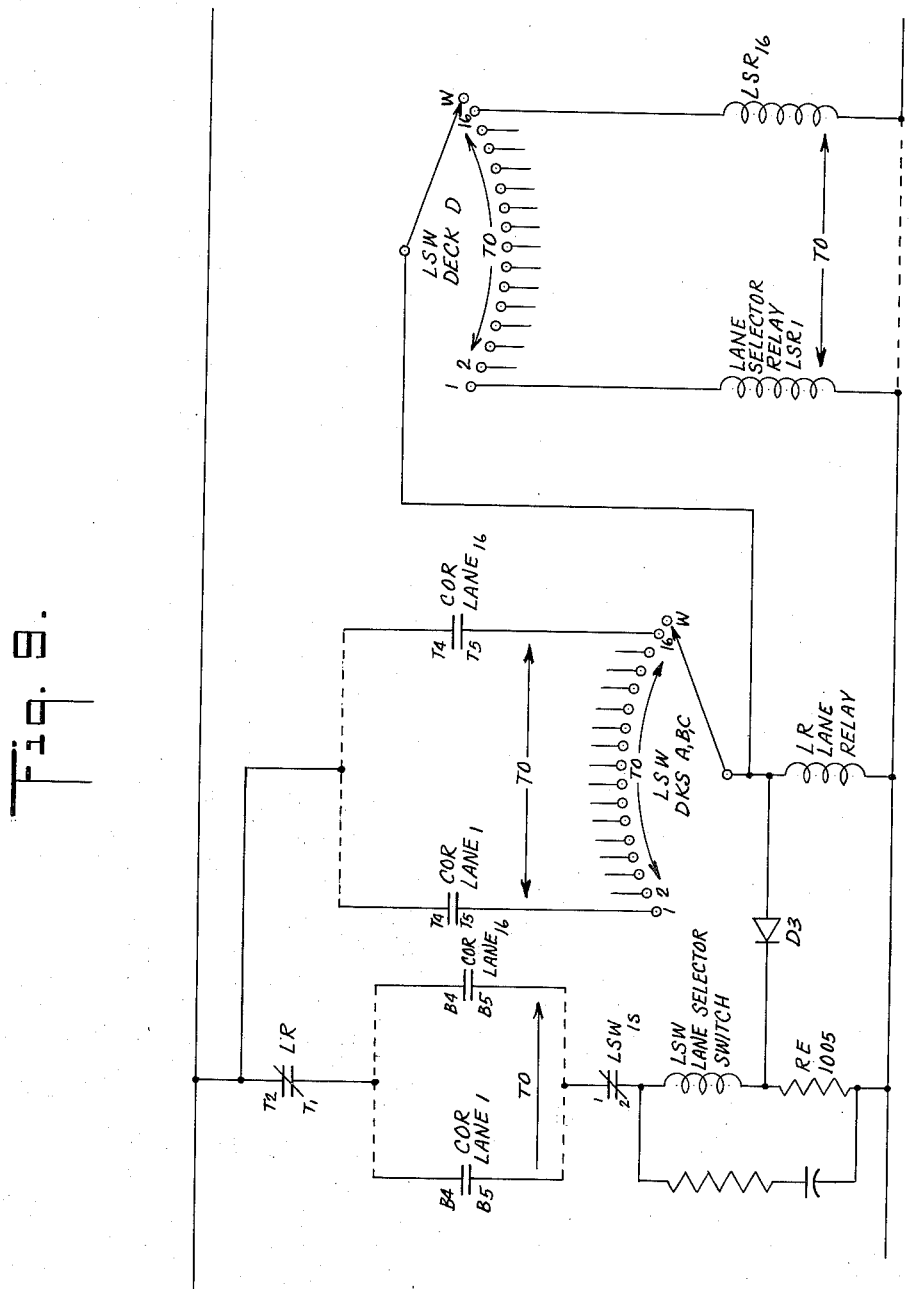
Fig. 9 is a diagrammatic representation of a charge scanning switch and associated circuits.

When the charge off normal relay COR is energized, its points B1—B2 will open, thus preventing the off normal relay ONR from operating and completing the system cycle. The charge off normal relay COR will close its B4—B5 points in the energizing circuit of a lane selector switch LSW (Fig. 9). It will also close its T4—T5 points which indicate to the wiper of the lane selector switch (Fig. 9) which of the lanes has been selected. At the same time, it will close its T6—T7 points (Fig. 10) which result in energization of the charge lock solenoid CLS. It will be remembered from the description of the card reader that the charge lock solenoid operates the card locking pin in the reader. Therefore, closure of the T6—T7 points of the charge off normal relay COR will energize the charge lock solenoid CLS (Fig. 10) to lock the charge card in the reader. As previously pointed out, the charge lock solenoid CLS will close its contacts CL1 (Figs. 4 and 11) and provides an energizing circuit for the charge plate solenoid CPS (Figs. 4 and 11) which causes the reading of a card in the card reader.

The charge scan switch CSS will close its contacts 3—4 (Fig. 11) thereby completing a circuit to the punch motors PM1 or PM2, depending on the state of the punch transfer relay PTR (Fig. 8). This circuit (Fig. 11) is by way of the now closed T9—T10 points of the class relay CR, the now closed 3—4 points of the charge scan switch, the normally closed B4—B5 points of the shut down relay and through the closed T1—T2 points or the T2—T3 points of the punch transfer relay PTR, depending on the condition of the punch transfer relay PTR. It should be stated at this point that a standby tape punch is employed and is put into service automatically upon the failure of the principal punch.

As soon as the charge plate solenoid is energized to bring the card reading pins into reading position and an appropriate class relay CR is energized, the data for the lane in which the operation is taking place is impressed on the charge scan switch CSS (Fig. 12).

The fixed data pertaining to the lane, such as the operational commands and the toll lane identification number, are constantly present in the charge scan switch. The card reading pins are directly connected to the corresponding terminals of the charge scan switch while the vehicle classification number is routed to the punch by the switch through closed points of the selected class relay. It can be seen, therefore, that a single cycle of the charge scan switch will successively make available all of the information that is to punched into the tape.

When the off normal contacts of the charge scan switch close the charge off normal relay COR, as explained, the lane selector switch LSW (Fig. 9) will start stepping from point to point until it finds the charge off normal relay COR that has been energized by the charge scan switch. Specifically, the COR relay points B4—B5 (Fig. 9) will be closed upon energization of the charge off normal relay COR thereby establishing and energizing a circuit for the lane selector switch coil LSW by way of the normally closed T1—T2 points (Fig. 9) of a lane relay LR and the normally closed 1—2 interrupting spring points of the lane selector switch LSW which open when the lane selector switch LSW is energized. The coil of the lane selector switch LSW operates the wiper of the switch in step-by-step progression by reason of its interrupter contacts LSW 1—2 which open and close with each step of the switch.

It will be noted in Fig. 9, that the lane selector switch LSW has sixteen positions. It is arbitrarily presumed that the toll plaza in which the equipment is employed has a corresponding number of lanes. Since each lane has a charge off normal relay COR, it is necessary to sample the T4—T5 points of each of the sixteen COR relays which are associated respectively with the sixteen different traffic lanes. It is this device which prevents the uncontrolled flow of data from a plurality of lanes which may have a charge transaction in progress. A number of lanes may set up the data for a charge transaction and energize its charge off normal relay COR but the data set up in the charge scan switch of any number of lanes will await a read-out until the lane selector switch LSW samples the T4—T5 points of the COR relay of a particular lane to determine the status of the relay.

When the lane selector switch LSW finds the first charge off normal relay COR which has been picked up, it will stop because its coil will be shorted out through a diode D3. The wiper at deck D of the lane selector switch will transmit current to a lane selector relay LSR (Fig. 9) corresponding to the energized charge off normal relay COR which has been sampled and found to be energized. Energization of the lane selector relay LSR provides a path for the charge scan switch to be controlled by the tape punch such that the read-out of information through the charge scan switch will be timed with the operation of the punch. The charge scan switch CSS is now energized through the A cam contact in the tape punch (see Figs. 5 and 7). When the A cam contact is closed, it completes a circuit through the normally closed punch transfer relay points T4—T5, the normally closed points T4—T5 of the shut down relay SR and the now closed points T2—T3 of the lane selector relay LSR. Because the charge scan switch is energized, its interrupter spring contacts (Fig. 10) will close and energize the punch clutch solenoid PCS (Fig. 10). Specifically, this circuit is through the now closed 2—3 points of the charge scan switch (Fig. 10), the now closed B2—B3 points of the lane selector relay, the normally closed points of the shut down relay SR, the normally closed points B7—B8 of the punch transfer relay PTR and the now closed points of the B cam contacts on the punch.

The punch cam shaft will now make one revolution. After 15° rotation of the cam shaft, its A cam contacts will open (Fig. 8) thereby interrupting the circuit to the charge scan switch CSS which was previously traced. The contacts of the A cam reclose at 358° of the punch cycle. At this point, the charge scan switch will advance to its next position and the above sequence will be repeated until each of the twenty-five positions of the charge scan switch have been read out.

After twenty-five steps, the off normal contacts 1—2 (Fig. 10) of the charge scan switch CSS open to drop out the charge off normal relay COR. This drops out the lane relay LR (Fig. 9) by opening the T4—T5 points of the charge off normal relay COR. The lane selector switch LSW may now select a new lane. The lane selector relay LSR is also dropped out by the opening of the T4—T5 points of the charge off normal relay COR.

When the charge off normal relay COR is deenergized, its contacts B1—B2 (Fig. 7) again close to energize the off normal relay ONR and the points T6—T7 (Fig. 10) of the charge off normal relay COR now open, deenergizing the charge lock solenoid CLS. When the class relay CR (Fig. 6) is deenergized, its points T9—T10 (Fig. 11) break the circuit to the charge plate solenoid CPS.

Since the charge transaction takes longer than the length of the system cycle, the money stepping switch SSWM will be on position 11, and therefore, the money stepping switch SSWM points 2—3 (Fig. 7) will be closed. Since the B1—B2 contacts of the charge off normal relay COR have reclosed, the off normal relay ONR will be energized causing the system cycle to end. This provides an interlock which insures that the charge cycle will not end before the charge transaction is completely finished.

Since the charge transaction takes longer than provided for by the money stepping switch SSWM, the switch will simply remain on position 11 until the charge transation is completed, whereupon the off normal relay ONR will return the wiper of the switch to position 1 by reclosing the COR contacts B1—B2.

The system cycle is terminated by energization of the off normal relay ONR through the 1—2 points of the money stepping switch SSWM when the wiper of that switch is on its 11th position. In Fig. 7, it can be seen that when the 1—2 points of the money stepping switch SSWM are closed that an energizing path is provided through the B1—B2 points of the charge off normal relay COR whereby the off normal relay ONR is energized. When the off normal relay ONR is energized, it will close its T2—T3 points and will open its normally closed B4—B5 points. When the latter points open, they interrupt the circuit to the cycle control relay CCR. Closure of the T2—T3 points of the off normal relay ONR establishes a circuit to the money stepping switch coil SSWM through these now closed points, through the normlly closed B1—B2 points of the cycle control relay CCR, and through the closed 1—2 points of the money stepping switch SSWM. This results in the money stepping switch SSWM advancing one step, thus restoring it to its rest position. Now the off normal relay ONR will drop out since the 1—2 points of the money stepping SSWM have reopened.

Figure 11:
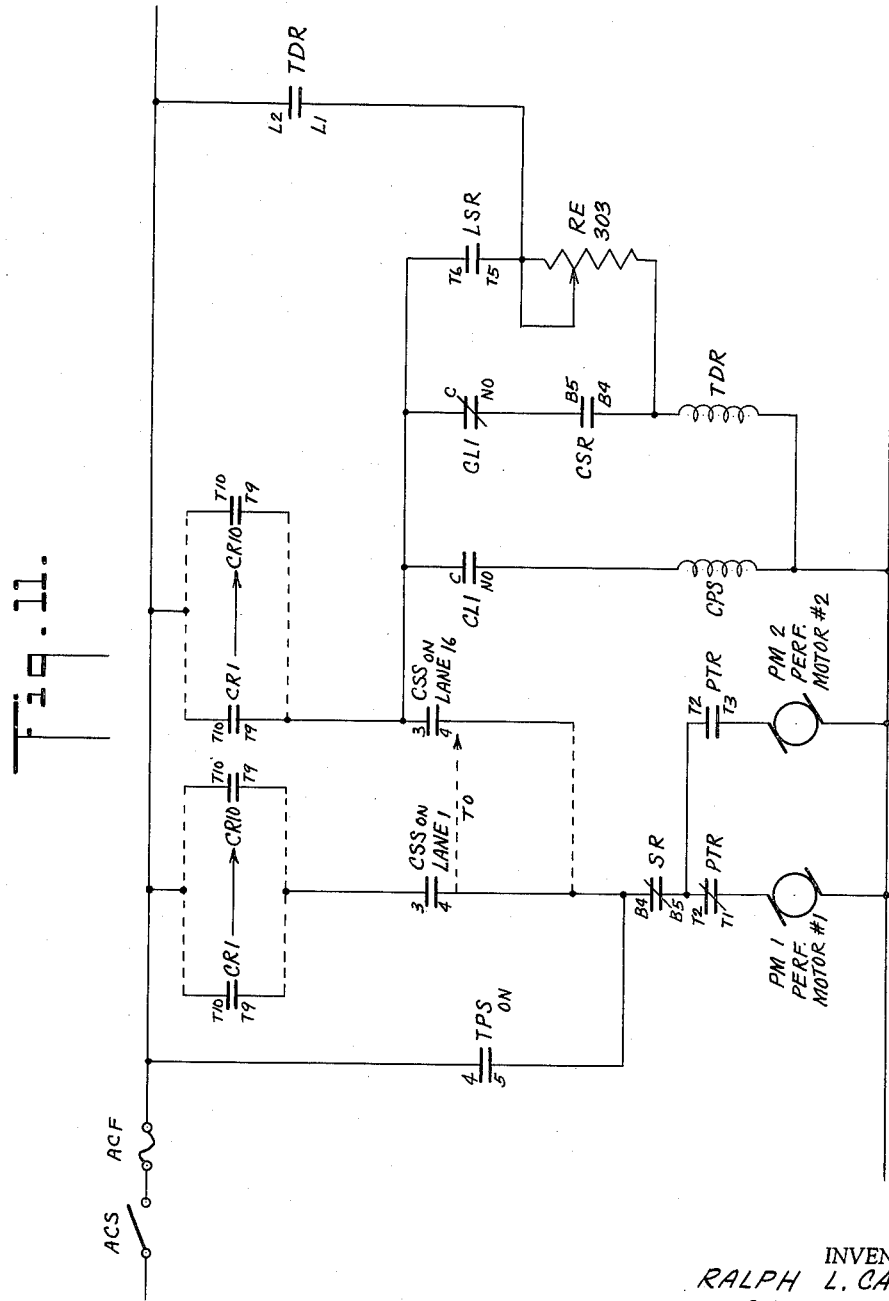
Fig. 11 is a wiring diagram of circuits associated with the tape punch.

The time delay relay TDR (Fig. 11) is energized by way of the adjustable resistance RE301 (Fig. 11) which is capable of producing a delay of about 7 seconds, and by way of the T9—T10 points of the class relay CR (Fig. 11). The time delay relay is held through its own closed contacts L1—L2. The time delay relay TDR, by opening its R2—R3 points (Fig. 10) deenergizes the charge off normal relay COR, indicating that the charge cycle has taken too long by reason of failure of some scanning switch or other element. This permits the charge card to be removed from the reader and it disables the lane in which the faulty operation occurred without effecting the operation of any of the other lanes.

Figure 14:
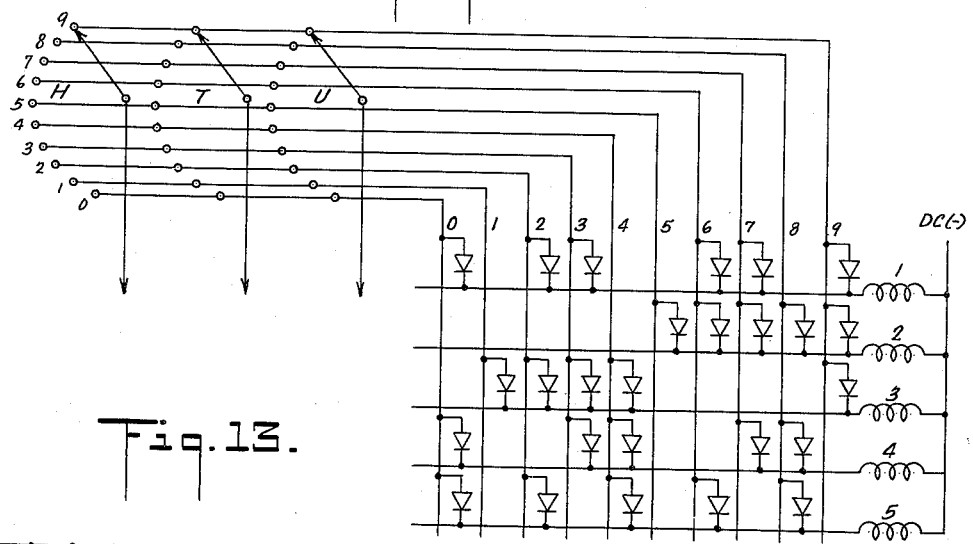
Fig. 14 is a detailed illustration of the contents of the identifier block and the diode matrix of Fig. 12.
Figure 13:
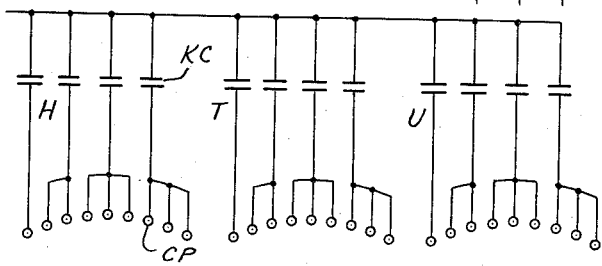
Fig. 13 is a diagrammatic illustration of key operated contacts associated with the collector's identifier.

It has been stated that the key 12, which is inserted by the toll collector into the classification button box and toll collector identifier 10 of Fig. 1, will set up the collector number so that it can be punched into the tape. Fig. 13 is a diagrammatic illustration of three groups of contact points each group consisting of four contacts KC. When the operator turns his key in the classification button box and collector identifier 10, he will close one or more of the contacts of the three groups. Each of the contacts is led out to one or more contact points CP. The contact points CP are respectively those shown in the units, tens and hundreds position of the collector identifier read-out switch. The units position of the collector identifier read-out switch is connected to position 8 of deck F of the charge scan switch, shown in Fig. 12. The tens position is connected to position 7 of deck F of the charge scan switch, and the hundreds position is connected to position 6 of the same deck. The wiper of each digit will be pulsed individually to the segment corresponding to the digit set-up by the collector's key. Then when the charge scan switch is stepped through positions 6, 7 and 8, reading out of the collector identification switch will take place by way of the diode matrix, which is shown in block form in Fig. 12 and in diagrammatic form in Fig. 14. The inputs to the diode matrix cross the energizing leads of the punch magnets PMC-1 through PMC-5 and are interconnected by diodes, as shown, to obtain the desired response for any input. Thus, if the units digit 5 is set up for the collector's number, a pulse will be transmitted through the fifth point of the unit switch and through the diode connecting line 5 of the switch with punch magnet PMC-2, and a hole will be punched in the second lever of the tape to represent the digit 5.

Point 9 of the charge scan switch CSS (Fig. 12) is connected to the network consisting of the class relays CR1 through CR10 such that when its wiper arrives at point 9, it scans the class relay network and transmits a pulse to the diode encoding matrix by way of the closed T7—T8 points of such class relay as may be energized. Thus, the vehicle classification number in the decimal notation is translated by the diode matrix into the multi-bit tape code by which the appropriate punch magnets PMC-1, etc. are energized. It can be seen, therefore, that both the toll collector's identification number and the vehicle classification number, both originally manifested in the decimal notation, are routed through the diode matrix where they are transmitted into the multi-bit tape code which is acceptable to the tape punch.

The remaining charge data is manifested at the charge scan switch CSS directly in the multi-bit code, as previously stated. The points of the charge scan switch CSS, which pass the data which is in the tape code, are, therefore, not connected to the diode matrix but are connected directly to the tape punch, as shown at the left in Fig. 12. The circuit at the left in Fig. 12 represents the connections for reading the potentials in five levels at a single point of the charge scan switch CSS which are required to transmit the bits of a single digit to the respective punch magnets PMC-1 through PMC-5. A similar circuit will be provided for all the remaining points of the charge scan switch at which the data is represented in the tape code.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. In a charge recording system for a toll plaza having a plurality of traffic lanes, means at each of a plurality of traffic lanes for reading a charge account number from a charge plate and for manifesting the digits of a number read therein as electrical potentials, a keyboard at each of said lanes for generating electrical potentials representative of vehicle classifications, a signal manifesting device at each of said lanes having discrete positions therein for receiving each of the potentials generated at said reading means and at said keyboard, connections for transmitting said potentials from said reading means and said keyboard to said signal manifesting device, a single recorder common to said lanes, scanning means individual to each of said signal manifesting means for sampling the positions thereof and for transmitting potentials thereon to said recorder for controlling the recording function thereof, means individual to each of said signal manifesting devices for indicating the presence of potentials therein, and common means for successively sensing said indicating means and for initiating the operation of said scanning means to transmit potentials into said common recorder.

2. In a charge recording system for a toll plaza having a plurality of traffic lanes, a punched card reader at each of a plurality of traffic lanes for reading perforations representing a charge account number from a charge plate and for manifesting the digits of a number read therein as electrical potentials, a keyboard at each of said lanes for generating electrical potentials representative of vehicle classifications, a signal manifesting device at each of said lanes having discrete positions therein for receiving each of the potentials generated at said reading means and at said keyboard, connections for transmitting said potentials from said reader and said keyboard to said signal manifesting device, a single recorder common to said lanes, scanning means individual to each of said signal manifesting means for sampling the positions thereof and for transmitting potentials thereon to said recorder for controlling the recording function thereof, means individual to each of said signal manifesting devices for indicating the presence of potentials therein, and common means for successively sensing said indicating means and for initiating the operation of said scanning means to transmit potentials into said common recorder.

3. In a charge recording system for a toll plaza having a plurality of traffic lanes, means at each of a plurality of traffic lanes for reading a charge account number from a charge plate and for manifesting the digits of a number read therein as electrical potentials, a keyboard at each of said lanes for generating electrical potentials representative of vehicle classifications, a signal manifesting device at each of said lanes having discrete positions therein for receiving each of the potentials generated at said reading means and at said keyboard, connections for transmitting said potentials from said reading means and said keyboard to said signal manifesting device, a single punched tape recorder common to said lanes, scanning means individual to each of said signal manifesting means for sampling the positions thereof and for transmitting potentials thereon to said recorder for controlling the recording function thereof, means individual to each of said signal manifesting devices for indicating the presence of potentials therein, and common means for successively sensing said indicating means and for initiating the operation of said scanning means to transmit potentials into said common recorder.

4. In a charge recording system for a toll plaza having a plurality of traffic lanes, a punched card reader at each of a plurality of traffic lanes for reading perforations representing a charge account number from a charge plate and for manifesting the digits of a number read therein as electrical potentials, a keyboard at each of said lanes for generating electrical potentials representative of vehicle classifications, a signal manifesting device at each of said lanes having discrete positions therein for receiving each of the potentials generated at said reading means and at said keyboard, connections for transmitting said potentials from said reader and said keyboard to said signal manifesting device, a single punched tape recorder common to said lanes, scanning means individual to each of said signal manifesting means for sampling the positions thereof and for transmitting potentials thereon to said recorder for controlling the recording function thereof, means individual to each of said signal manifesting devices for indicating the presence of potentials therein, and common means for successively sensing said indicating means and for initiating the operation of said scanning means to transmit potentials into said common recorder.

5. In a charge recording system for a toll plaza having a plurality of traffic lanes, means at each of a plurality of traffic lanes for reading a charge account number from a charge plate and for manifesting the digits of a number read therein as electrical potentials, a keyboard at each of said lanes for generating electrical potentials representative of vehicle classifications, a stepping switch at each of said lanes having discrete positions therein for receiving each of the potentials generated at said reading means and at said keyboard, connections for transmitting said potentials from said reading means and said keyboard to said signal manifesting device, a single recorder common to said lanes, a wiper individual to each of said stepping switches for sampling the positions thereof and for transmitting potentials thereon to said recorder for controlling the recording function thereof, means individual to each of said stepping switches for indicating the presence of potentials therein, and common means for successively sensing said indicating means and for initiating the operation of said wipers to transmit potentials into said common recorder.

6. In a charge recording system for a toll plaza having a plurality of traffic lanes, means at each of a plurality of traffic lanes for reading a charge account number from a charge plate and for manifesting the digits of a number read therein as electrical potentials, a keyboard at each of said lanes for generating electrical potentials representative of vehicle classifications, a signal manifesting device at each of said lanes having discrete positions therein for receiving each of the potentials generated at said reading means and at said keyboard, connections for transmitting said potentials from said reading means and said keyboard to said signal manifesting device, a single recorder common to said lanes, scanning means individual to each of said signal manifesting means for sampling the positions thereof and for transmitting potentials thereon to said recorder for controlling the recording function thereof, a relay individual to each of said signal manifesting devices for indicating the presence of potentials therein, and common means for successively sensing said relays and for initiating the operation of said scanning means to transmit potentials into said common recorder.

7. In a charge recording system for a toll plaza having a plurality of traffic lanes, means at each of a plurality of traffic lanes for reading a charge account number from a charge plate and for manifesting the digits of a number read therein as electrical potentials, a keyboard at each of said lanes for generating electrical potentials representative of vehicle classifications, a stepping switch at each of said lanes having discrete positions therein for receiving each of the potentials generated at said reading means and at said keyboard, connections for transmitting said potentials from said reading means and said keyboard to said signal manifesting device, a single recorder common to said lanes, a wiper individual to each of said stepping switches for sampling the positions thereof and for transmitting potentials thereon to said recorder for controlling the recording function thereof, a relay individual to each of said stepping switches for indicating the presence of potentials therein, and common means for successively sensing said relays and for initiating the operation of said wipers to transmit potentials into said common recorder.

8. In a charge recording system for a toll plaza having a plurality of traffic lanes, a punched card reader at each of a plurality of traffic lanes for reading perforations representing a charge account number from a charge plate and for manifesting the digits of a number read therein as electrical potentials, a keyboard at each of said lanes for generating electrical potentials representative of vehicle classifications, a stepping switch at each of said lanes having discrete positions therein for receiving each of the potentials generated at said reading means and at said keyboard, connections for transmitting said potentials from said reader and said keyboard to said signal manifesting device, a single punched tape recorder common to said lanes, a wiper individual to each of said stepping switches for sampling the positions thereof and for transmitting potentials thereon to said recorder for controlling the recording function thereof, a relay individual to each of said stepping switches for indicating the presence of potentials therein, and common means for successively sensing relays and for initiating the operation of said wipers to transmit potentials into said common recorder.

9. In a charge recording system for a toll plaza, means for reading a charge plate having therein a charge account number in the form of a multi-bit code and for manifesting such number as electrical potentials, means for generating in the decimal notation additional data relating to a charge transaction and for manifesting such data as electrical potentials, a signal manifesting device having discrete positions therein for receiving each of the potentials generated at both of said means, connections for transmitting said potentials from both of said means to said signal manifesting device, a single recorder adapted to record data in the form of said multi-bit code, connections directly connecting said recorder and the positions of said signal manifesting device containing potentials transmitted from said reading means, an encoding matrix adapted to receive potentials representative of data in the decimal notation and translate such potentials into data representing potentials in the form of said multi-bit code, connections between said matrix and the positions of said signal manifesting device containing potentials transmitted from said additional data generating means, connections from said matrix to said recorder, and means for sequentially scanning the positions of said data manifesting device for transmitting potentials to said recorder by way of said connections.

10. In a charge recording system for a toll plaza, means for reading a charge plate having therein a charge account number in the form of a perforated multi-bit code and for manifesting such number as electrical potentials, means for generating in the decimal notation additional data relating to a charge transaction and for manifesting such data as electrical potentials, a signal manifesting device having discrete positions therein for receiving each of the potentials generated at both of said means, connections for transmitting said potentials from both of said means to said signal manifesting device, a single tape punch adapted to record data in the form of said multi-bit code, connections directly connecting said tape punch and the positions of said signal manifesting device containing potentials transmitted from said reading means, an encoding matrix adapted to receive potentials representative of data in the decimal notation and translate such potentials into data representing potentials in the form of said multi-bit code, connections between said matrix and the positions of said signal manifesting device containing potentials transmitted from said additional data generating means, connections from said matrix to said tape punch, and means for sequentially scanning the positions of said data manifesting device for transmitting potentials to said tape punch by way of said connections.

11. In a charge recording system for a toll plaza, means for reading a charge plate having therein a charge account number in the form of a multi-bit code and for manifesting such number as electrical potentials, means for generating in the decimal notation additional data relating to a charge transaction and for manifesting such data as electrical potentials, a stepping switch having discrete positions therein for receiving each of the potentials generated at both of said means, connections for transmitting said potentials from both of said means to said stepping switch, a single recorder adapted to record data in the form of said multi-bit code, connections directly connecting said recorder and the positions of said stepping switch containing potentials transmitted from said reading means, an encoding matrix adapted to receive potentials representative of data in the decimal notation and translate such potentials into data representing potentials in the form of said multi-bit code, connections between said matrix and the positions of said stepping switch containing potentials transmitted from said additional data generating means, connections from said matrix to said recorder, and means for sequentially scanning the positions of said stepping switch for transmitting potentials to said recorder by way of said connections.

12. In a charge recording system for a toll plaza, means for reading a charge plate having therein a charge account number in the form of a perforated multi-bit code and for manifesting such number as electrical potentials, means for generating in the decimal notation additional data relating to a charge transaction and for manifesting such data as electrical potentials, a stepping switch having discrete positions therein for receiving each of the potentials generated at both of said means, connections for transmitting said potentials from both of said means to said stepping switch, a single tape punch adapted to record data in the form of said multi-bit code, connections directly connecting said tape punch and the positions of said stepping switch containing potentials transmitted from said reading means, an encoding matrix adapted to receive potentials representative of data in the decimal notation and translate such potentials into data representing potentials in the form of said multi-bit code, connections between said matrix and the positions of said stepping switch containing potentials transmitted from said additional data generating means, connections from said matrix to said tape punch, and means for sequentially scanning the positions of said stepping switch for transmitting potentials to said tape punch by way of said connections.

13. In a charge recording system for a toll plaza, means for reading a charge plate having therein a charge account number in the form of a multi-bit code and for manifesting such number as electrical potentials, a key operated switch for generating in the decimal notation a toll collector's identification number and for manifesting such number as electrical potentials, a signal manifesting device having discrete positions therein for receiving each of the potentials generated at said reading means and at said key switch, connections for transmitting said potentials from said reading means and at said key switch to said signal manifesting device, a single recorder adapted to record data in the form of said multi-bit code, connections directly connecting said recorder and the positions of said signal manifesting device containing potentials transmitted from said reading means, an encoding matrix adapted to receive potentials representative of a collector's identification number in the decimal notation and translate such potentials into data representing potentials in the form of said multi-bit code, connections between said matrix and the positions of said signal manifesting device containing potentials transmitted from said key switch, connections from said matrix to said recorder, and means for sequentially scanning the positions of said data manifesting device for transmitting potentials to said recorder by way of said connections.

14. In a charge recording system for a toll plaza, means for reading a charge plate having therein a charge account number in the form of a multi-bit code and for manifesting such number as electrical potentials, a key operated switch for generating in the decimal notation a vehicle classification number and for manifesting such number as electrical potentials, a signal manifesting device having discrete positions therein for receiving each of the potentials generated at said reading means and at said key switch, connections for transmitting said potentials from said reading means and at said key switch to said signal manifesting device, a single recorder adapted to record data in the form of said multi-bit code, connections directly connecting said recorder and the positions of said signal manifesting device containing potentials transmitted from said reading means, an encoding matrix adapted to receive potentials representative of a vehicle classification number in the decimal notation and translate such potentials into data representing potentials in the form of said multi-bit code, connections between said matrix and the positions of said signal manifesting device containing potentials transmitted from said key switch, connections from said matrix to said recorder, and means for sequentially scanning the positions of said data manifesting device for transmitting potentials to said recorder by way of said connections.

15. In a charge recording system for a toll plaza, means for reading a charge plate having therein a charge account number in the form of a perforated multi-bit code and for manifesting such number as electrical potentials, a key operated switch for generating in the decimal notation a toll collector's identification number and for manifesting such number as electrical potentials, a stepping switch having discrete positions therein for receiving each of the potentials generated at said reading means and at said key switch, connections for transmitting said potentials from said reading means and at said key switch to said stepping switch, a single tape punch adapted to record data in the form of said multi-bit code, connections directly connecting said tape punch and the positions of said stepping switch containing potentials transmitted from said reading means, an encoding matrix adapted to receive potentials representative of a collector's identification number in the decimal notation and translate such potentials into data representing potentials in the form of said multi-bit code, connections between said matrix and the positions of said stepping switch containing potentials transmitted from said key switch, connections from said matrix to said tape punch, and means for sequentially scanning the positions of said stepping switch for transmitting potentials to said tape punch by way of said connections.

16. In a charge recording system for a toll plaza, means for reading a charge plate having therein a charge account number in the form of a perforated multi-bit code and for manifesting such number as electrical potentials, a key operated switch for generating in the decimal notation a vehicle classification number and for manifesting such number as electrical potentials, a stepping switch having discrete positions therein for receiving each of the potentials generated at said reading means and at said key switch, connections for transmitting said potentials from said reading means and said key switch to said stepping switch, a single tape punch adapted to record data in the form of said multi-bit code, connections directly connecting said tape punch and the positions of said stepping switch containing potentials transmitted from said reading means, an encoding matrix adapted to receive potentials representative of a vehicle classification number in the decimal notation and translate such potentials into data representing potentials in the form of said multi-bit code, connections between said matrix and the positions of said stepping switch containing potentials transmitted from said key switch, connections from said matrix to said tape punch, and means for sequentially scanning the positions of said stepping switch for transmitting potentials to said tape punch by way of said connections.

References Cited in the file of this patent

UNITED STATES PATENTS

| | | |
|---|---|---|
| 1,801,981 | Rogal et al. | Apr. 21, 1931 |
| 1,927,556 | Nelson | Sept. 19, 1933 |
| 2,018,420 | Robinson et al. | Oct. 22, 1935 |
| 2,878,872 | Burns et al. | Mar. 24, 1959 |